United States Patent
Koester et al.

(10) Patent No.: US 10,691,549 B2
(45) Date of Patent: Jun. 23, 2020

(54) SYSTEM MANAGED FACILITATION OF BACKUP OF DATASET BEFORE DELETION

(71) Applicant: INTERNATIONAL BUSINESS MACHINES CORPORATION, Armonk, NY (US)

(72) Inventors: Michael J. Koester, Hollister, CA (US); Kevin L. Miner, Apopka, FL (US); Trinh Nguyen, San Jose, CA (US); Steven Huntington, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 192 days.

(21) Appl. No.: 15/892,354

(22) Filed: Feb. 8, 2018

(65) Prior Publication Data
US 2019/0243716 A1   Aug. 8, 2019

(51) Int. Cl.
*G06F 11/14*   (2006.01)
*G06F 16/16*   (2019.01)

(52) U.S. Cl.
CPC ........ *G06F 11/1451* (2013.01); *G06F 16/162* (2019.01); *G06F 2201/84* (2013.01)

(58) Field of Classification Search
CPC .................................................. G06F 11/1451
See application file for complete search history.

(56) References Cited

U.S. PATENT DOCUMENTS

| | | | |
|---|---|---|---|
| 5,317,728 A | 5/1994 | Tevis et al. | |
| 2004/0044845 A1 | 3/2004 | Gibble et al. | |
| 2013/0024423 A1* | 1/2013 | Doshi | G06F 11/1448 707/640 |
| 2016/0253362 A1 | 9/2016 | Zhuang et al. | |
| 2016/0283329 A1* | 9/2016 | Natanzon | G06F 11/1453 |
| 2016/0306984 A1* | 10/2016 | Amarendran | H04L 67/10 |

* cited by examiner

*Primary Examiner* — Van H Oberly
(74) *Attorney, Agent, or Firm* — Rabindranath Dutta; Konrad Raynes Davda & Victor LLP (57) ABSTRACT

A storage controller receives a command to delete a dataset stored in a first set of storage volumes controlled by the storage controller. In response to receiving the command, a determination is made as to whether an indicator has been enabled to protect the dataset against an accidental deletion. In response to determining that the indicator has been enabled, the dataset is copied from the first set of storage volumes to a second set of storage volumes controlled by the storage controller. In response to completion of the copying of the dataset from the first set of storage volumes to the second set of storage volumes, the command to delete the dataset stored in the first set of storage volumes is executed.

20 Claims, 8 Drawing Sheets

SYSTEM MANAGED FACILITATION OF BACKUP OF DATASET BEFORE DELETION

BACKGROUND

1. Field

Embodiments relate to a system managed facilitation of backup of a dataset before deletion of the dataset.

2. Background

In certain computing environments, a computational device such as a storage controller may control access to storage for one or more host computational devices that may be coupled to the storage controller over a network. A storage management application that executes in the storage controller may manage a plurality of storage devices, such as disk drives, tape drives, flash drives, direct access storage devices (DASD), etc., that are coupled to the storage controller. A host computational device may send Input/Output (I/O) commands to the storage controller and the storage controller may execute the I/O commands to read data from the storage devices or write data to the storage devices.

Data is stored in physical storage volumes of storage devices. Logical storage volumes are generated by the storage controller to maintain the data stored in the physical storage volumes. Each logical storage volume may logically represent data stored in one or more physical storage volumes. Data is physically stored in the physical storage volumes and logically represented in the logical storage volumes. The storage controller manages and controls access to the logical and physical storage volumes.

SUMMARY OF THE PREFERRED EMBODIMENTS

Provided are a method, a system, a computer program product in which a storage controller receives a command to delete a dataset stored in a first set of storage volumes controlled by the storage controller. In response to receiving the command, a determination is made as to whether an indicator has been enabled to protect the dataset against an accidental deletion. In response to determining that the indicator has been enabled, the dataset is copied from the first set of storage volumes to a second set of storage volumes controlled by the storage controller. In response to completion of the copying of the dataset from the first set of storage volumes to the second set of storage volumes, the command to delete the dataset stored in the first set of storage volumes is executed.

In certain embodiments, in response to executing the command to delete the dataset stored in the first set of storage volumes, a backup is performed of the dataset stored in the second set of storage volumes to a cloud storage, a tape storage or a direct access storage device.

In additional embodiments, in response to determining that the indicator has been disabled, the command to delete the dataset stored in the first set of storage volumes is executed.

In further embodiments, the copying of the dataset from the first set of storage volumes to the second set of storage volumes is performed by a hardware implemented point in time copy operation.

In certain embodiments, the indicator is included in a plurality of indicators, wherein a first set of datasets are protected against accidental deletion by enabling a first set of indicators in the plurality of indicators, and wherein a second set of datasets are not protected against accidental deletion by disabling a second set of indicators in the plurality of indicators.

In further embodiments, the executing of the command to delete the dataset deletes a dataset control block record stored in a volume table of contents, wherein the dataset control block record maintains pointers to the dataset stored in the first set of storage volumes.

In yet further embodiments, the executing of the command to delete the dataset also deletes the dataset in the first set of storage volumes, wherein the storage controller includes a hierarchical storage manager, a storage management subsystem to determine a type of media from the backup, and a data facility storage management subsystem class to protect the dataset against the accidental deletion.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain operating systems, data on a storage volume is maintained in datasets, and pointers to these datasets are maintained within "data set control block" (DSCB) records in a "volume table of contents" (VTOC). When a dataset is deleted, the pointers to the dataset within the DSCB are destroyed and access to the dataset is lost. However because of a programmatic, administrative, or human error, the wrong dataset may have been deleted, resulting in the loss of a dataset that was not intended for deletion. The deletion of the wrong dataset may be an infrequent event. However, when such as event does occur, the results may be catastrophic depending on the contents of the dataset.

If it is determined that the wrong dataset was deleted in error, certain systems do not have any easy mechanism to recover the dataset. The dataset may only be recovered if the dataset had been backed up to some other media, such as another DASD volume, tape, or cloud storage prior to the dataset being deleted. In addition, a backup copy may be of use only if the backup was made just prior to the deletion of the dataset.

Certain embodiments provide mechanisms to facilitate the backup of a dataset before the dataset is deleted, by providing a system managed policy for backing up a dataset before the dataset is deleted.

In certain software systems such as a "hierarchical storage manager" (HSM) based system, an administrator may establish guidelines for how often different kinds of files are to be copied to a backup storage device. However HSM does not have an option to backup the dataset before the dataset is deleted. In certain embodiments, a "data facility storage management subsystem" (DFSMS) management class is defined to invoke HSM to facilitate a backup of the dataset before the dataset is deleted. This may be accomplished by using hardware point in time copy mechanisms to copy the dataset to an intermediate volume that is be used to transfer data to a backup storage device. By copying to an intermediate volume, certain embodiments free up the primary storage volume whose tracks are now available for use.

Exemplary Embodiments

Figure 1:
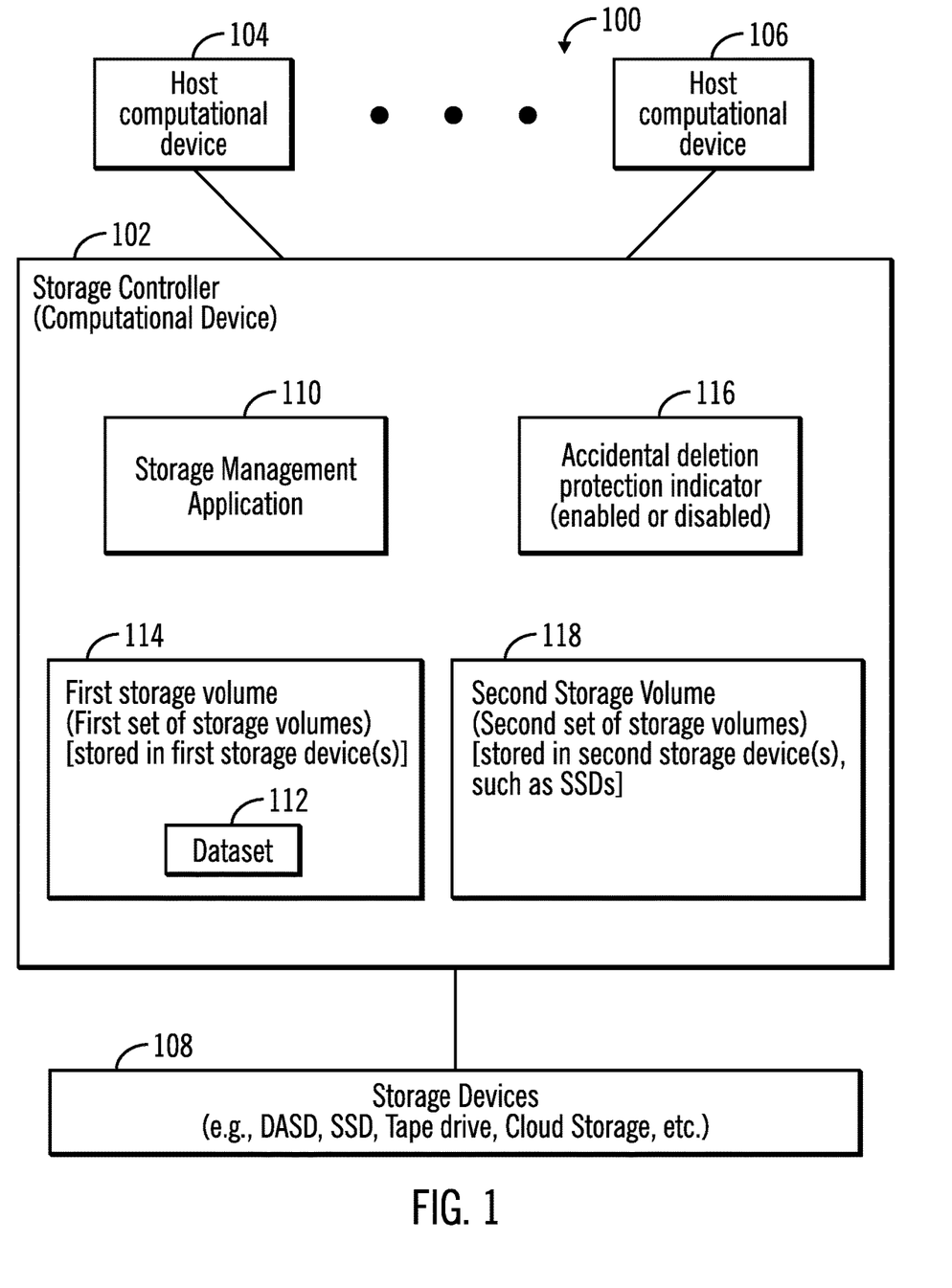
FIG. 1 illustrates a block diagram of a computing environment comprising a storage controller communicatively coupled to a plurality of host computational devices and a plurality of storage devices, in accordance with certain embodiments.

FIG. 1 illustrates a block diagram of a computing environment 100 comprising a storage controller 102 with a one or more central processing units (CPUs) communicatively coupled to a plurality of host computational devices 104, 106 and a plurality of storage devices 108, in accordance with certain embodiments/

The storage controller 102 and the host computational devices 104, 106 may comprise any suitable computational device including those presently known in the art, such as, a personal computer, a workstation, a server, a mainframe, a hand held computer, a palm top computer, a telephony device, a network appliance, a blade computer, a processing device, a controller, etc. The storage controller 102 may be comprised of a plurality of servers (not shown) that may provide redundancy because if one server undergoes a failure from which recovery is not possible, an alternate server may perform the functions of the server that failed. Each of the plurality of servers may be referred to as a processing complex or a central electronics complex (CEC) and may include one or more processors and/or processor cores. The storage controller 102 may also be referred to as a dual-server storage system.

The storage devices 108 controlled by the storage controller 102 may comprise DASD, solid state drives (SSD), tape drives or any other type of suitable storage device. Some or all of the storage devices 108 may be maintained in a cloud storage.

The storage controller 102, the host computational devices 104, 106, and the storage devices 108 may be elements in any suitable network, such as, a storage area network, a wide area network, the Internet, an intranet. In certain embodiments, the storage controller 102, the host computational devices 104, 106, and the storage devices 108 may be elements in a cloud computing environment.

A storage management application 110 executes in the storage controller 102. The storage management application 110 manages and controls Input/Output (I/O) access to storage volumes corresponding to the storage devices 108. In certain embodiments, the storage management application 110 may be implemented in software, hardware, firmware of any combination thereof.

In certain embodiments a dataset 112 may be stored in a first storage volume 114 controlled by the storage management application 110 of the storage controller 102. The first storage volume 114 is a logical storage volume and the dataset logically represented in the first storage volume is physically stored in a first storage device. The dataset 112 is any collection of data and may be in the form of data records or any other suitable data structure. In certain embodiments, the dataset 112 may be stored in a first set of storage volumes that include the first storage volume 114, i.e., the dataset 112 may be stored in one or more storage volumes corresponding to one or more storage devices.

An accidental deletion protection indicator 116 is maintained the storage controller 102, where the accidental deletion protection indicator 116 is enabled or disabled. For example, in certain embodiments, the accidental deletion protection indicator 116 is represented by a bit, where if the bit is set to 1 then the accidental deletion protection indicator 116 is enabled, and if the bit is set to 0 then the accidental deletion protection indicator 116 is disabled. When the accidental deletion protection indicator 116 is enabled, the storage manager application 110 facilitates mechanisms for generating a backup of the dataset 112 for recovery, substantially immediately (e.g., within 500 milliseconds) prior to any deletion of the dataset 112. When the accidental deletion protection indicator 116 is disabled, the storage manager application 110 does not facilitate mechanisms for generating a backup of the dataset 112 for recovery, substantially immediately prior to any deletion of the dataset 112.

In response to the accidental deletion protection indicator 116 being enabled, prior to deletion of the dataset 112 from the first storage volume 114 (or the first set of storage volumes) the storage management application 110 copies the dataset 112 to a second storage volume (or a second set of storage volumes) 118. The second storage volume 118 is stored in a second storage device that is different from the first storage device in which the first storage volume 114 is stored. In certain embodiments, the second storage volume 118 is stored in one or more solid state drives or some other device to which the dataset 112 may be copied expeditiously in comparison to DASDs. The second storage volume 118 may be regarded as an intermediate volume to which the dataset 112 is copied prior to deletion of the dataset 112. Once the dataset is copied to the second storage volume 118 the dataset 112 may be deleted. At an opportune time the copy of the dataset is backed up from the second storage volume 118 to other storage devices or locations (e.g., DASD, tape drive, cloud storage, etc.) whose access time is higher than the second storage device in which the second storage volume 118 is stored.

Therefore, FIG. 1 illustrates certain embodiments in which mechanisms are provided for recovery from an accidental deletion of the dataset 112, without substantially impacting the time for performing a deletion operation. The impact to the time for performing the deletion operation is reduced by copying the dataset 112 to the second storage volume 118 whose contents may be physically stored within the storage controller 102 in relatively fast storage (in comparison to DASD) such as SSD.

Figure 2:
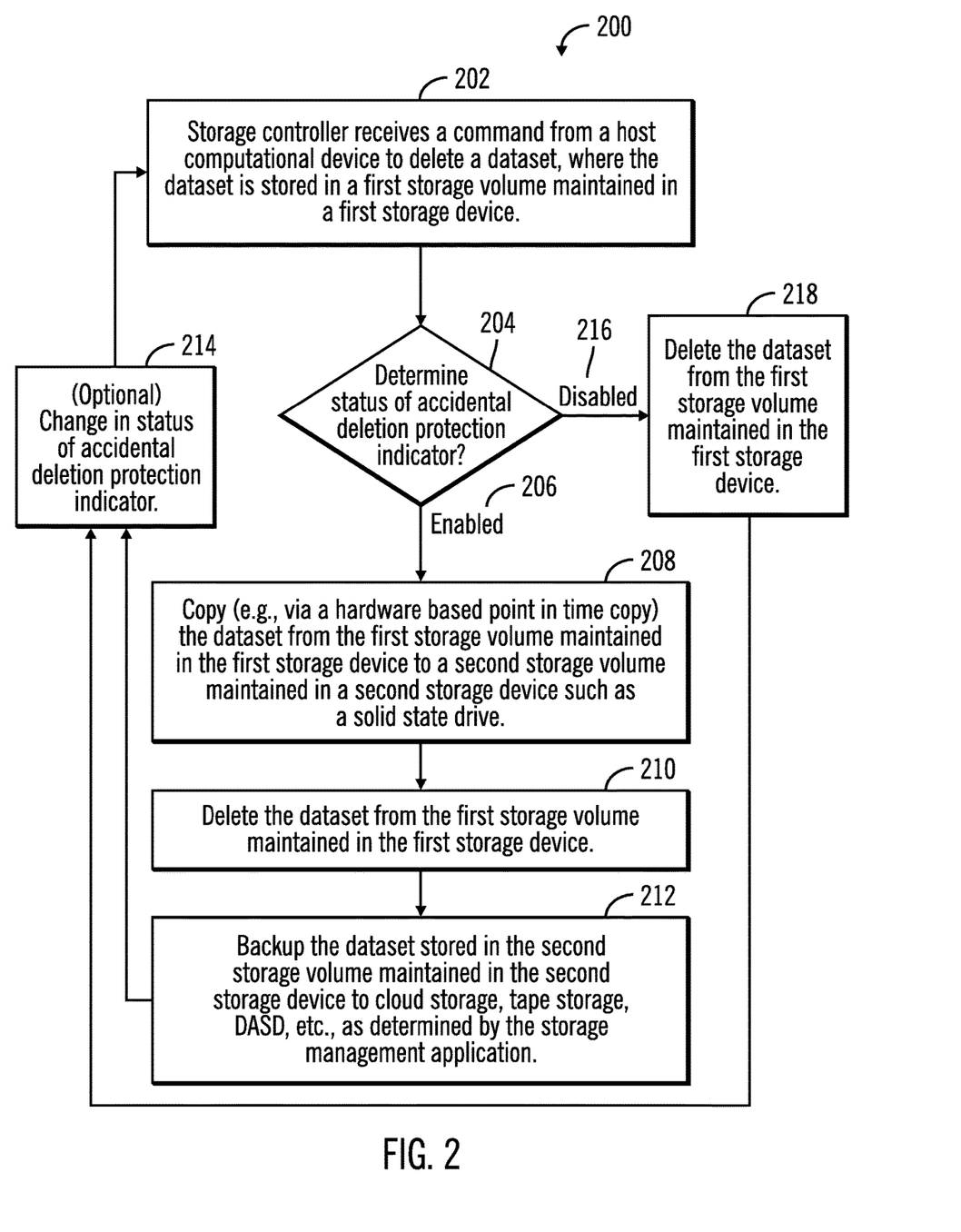
FIG. 2 illustrates a flowchart that shows operations to prevent accidental deletion of datasets in the computing environment of FIG. 1, in accordance with certain embodiments.

FIG. 2 illustrates a flowchart 200 that shows operations to prevent accidental deletion of datasets in the computing environment 100 of FIG. 1, in accordance with certain embodiments. In certain embodiments, the operations shown in FIG. 2 may be implemented in the storage controller 102 of the computing environment 100.

Control starts at block 202 in which the storage controller 102 receives a command from a host computational device 104 to delete a dataset 112, where the dataset 112 is stored in a first storage volume 114 maintained in a first storage device.

The storage controller 102 determines (at block 204) the status of the accidental deletion protection indicator 116. The accidental deletion protection indicator 116 may be enabled or disabled by a program or an administrator depending on the need for preventing accidental deletion for the dataset.

If at block 204 the storage controller 102 determines that accidental deletion protection indicator 116 is enabled (branch 206) then the storage controller 102 copies (e.g., via a hardware based point in time copy) the dataset 112 from the first storage volume 114 maintained in the first storage device to a second storage volume 118 maintained in a second storage device such as a solid state drive (at block 208).

From block 208 control proceeds to block 210 in which the storage controller 102 deletes the dataset 112 from the first storage volume 114 maintained in the first storage device. The storage controller 102 then performs (at block 212) a backup of the copy of the dataset stored in the second storage volume 118 maintained in the second storage device to cloud storage, tape storage, DASD, etc., as determined by the storage management application 110 that executes in the storage controller 102.

From block 212 control proceeds to block 214 in which in certain embodiments the status of the accidental deletion protection indicator 116 may be changed by a program, an administrator, etc., and then control returns to block 202 in which a new command to delete a dataset is received.

If at block 204 the storage controller 102 determines that accidental deletion protection indicator 116 is disabled (branch 216) then the storage controller 102 deletes (at block 218) the dataset 112 from the first storage volume 114 maintained in the first storage device (there is no copy of the dataset 112 created prior to the deletion of the dataset 112).

Therefore, FIG. 2 illustrates certain embodiments in which based on indications provided in an accidental deletion protection indicator 116, the storage controller 102 generates an intermediate copy of a dataset before deleting the dataset 112. The intermediate copy is backed up to a storage device at an opportune time such as when the processing load on the storage controller 102 is relatively low in comparison to the total processing capacity of the storage controller 102.

Figure 3:
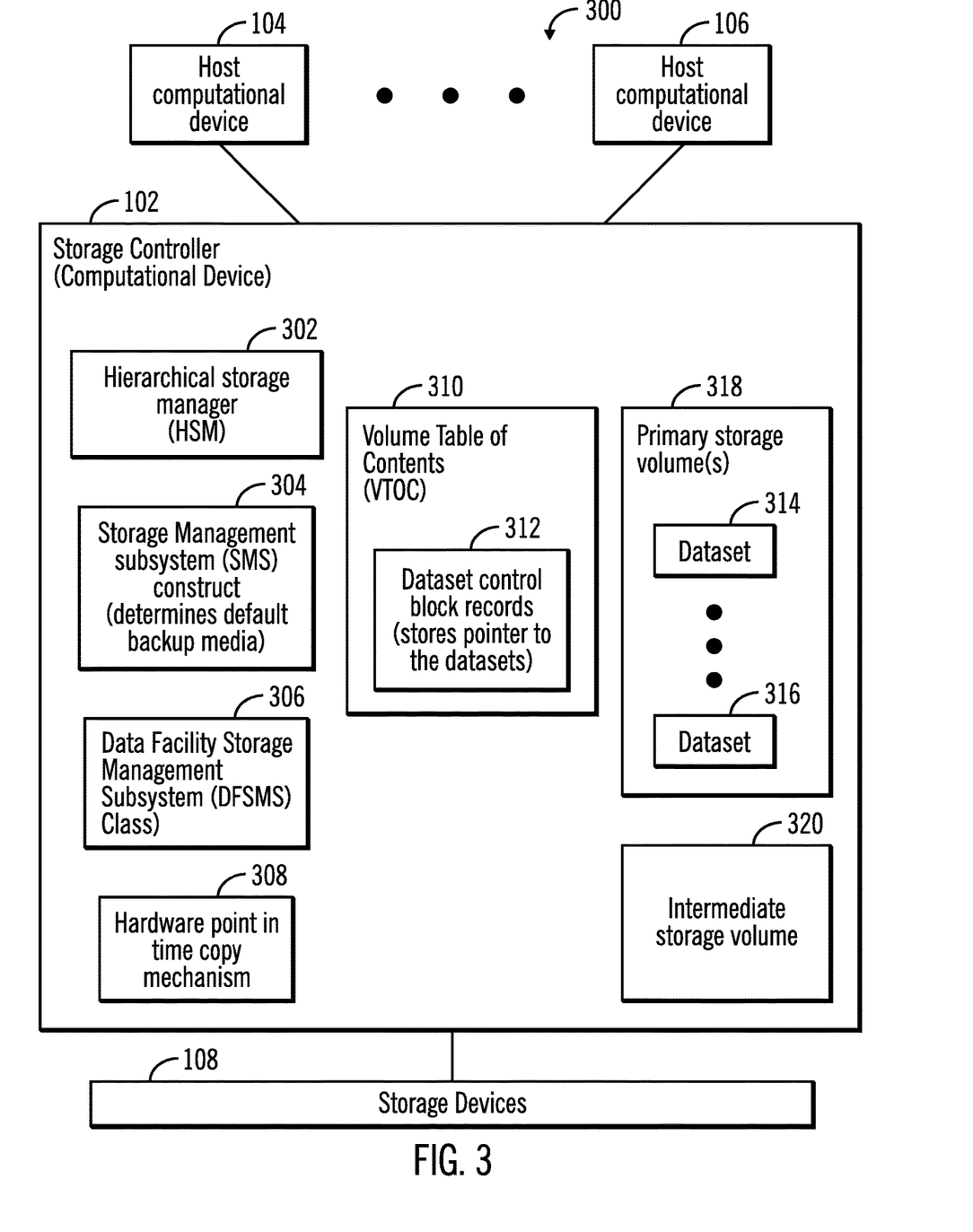
FIG. 3 illustrates a block diagram of another computing environment comprising a storage controller communicatively coupled to a plurality of host computational devices and a plurality of storage devices, in accordance with certain embodiments.

FIG. 3 illustrates a block diagram of another computing environment 300 comprising a storage controller 102 communicatively coupled to a plurality of host computational devices 104, 106 and a plurality of storage devices 108, in accordance with certain embodiments implemented in a z/OS* operating system environment.

In certain embodiments shown in FIG. 3, the storage controller 102 includes a hierarchical storage manager (HSM) 302, a storage management subsystem (SMS) construct 304, a data facility storage management subsystem (DFSMS) class 306, and a hardware point in time copy mechanism 308.

The storage controller 102 also includes a volume table of contents (VTOC) 310 that includes dataset control block records 312 that store pointers to datasets 314, 316 stored in one or more primary storage volumes 318. The storage controller 102 also includes one or more intermediate storage volumes 320 to which a dataset (e.g., dataset 314) may be copied to prior to deletion of the dataset (e.g., dataset 314) in the primary storage volume 318. Subsequent to deletion of the dataset 314 in the primary storage volume 318, the copy of the dataset stored in the intermediate storage volume 320 may be backed up to a storage device, such as a DASD, a tape device, etc., or to a cloud storage.

Figure 4:
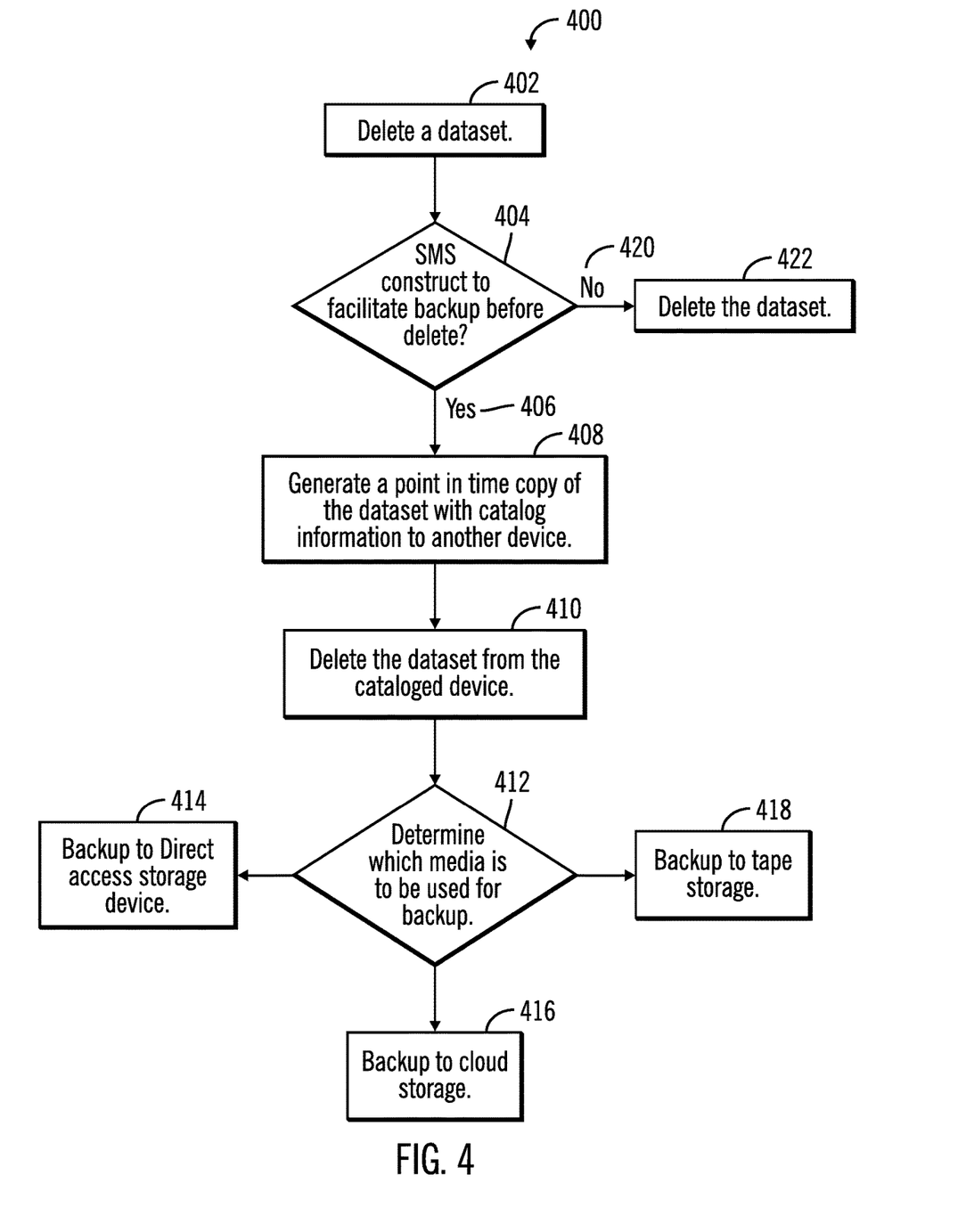
FIG. 4 illustrates a flowchart that shows operations to prevent accidental deletion of datasets in the computing environment of FIG. 3, in accordance with certain embodiments.

FIG. 4 illustrates a flowchart 400 that shows operations to prevent accidental deletion of datasets in the computing environment 300 of FIG. 3, in accordance with certain embodiments. In certain embodiments, the operations shown in FIG. 4 may be implemented in the storage controller 102 of the computing environment 300.

Control starts a block 402 in which the storage controller 102 receives a command to delete a dataset 314 stored in the one or more primary storage volumes 318. Control proceeds to block 404 in which the storage controller 102 determines whether the storage controller 102 includes a SMS construct 304 to facilitate backup before deletion of the dataset 314. If so ("Yes" branch 406) control proceeds to block 408 in which the storage controller 102 generates (at block 408) a point in time copy of the dataset 314 stored in the primary storage volume 318 along with the corresponding catalog information to the intermediate storage volume 320 that is on another storage device. The point in time copy may be generated by the hardware point in time copy mechanism 308. The storage controller 102 then deletes (at block 410) the dataset 314 from the cataloged device (i.e., the catalogued device is the storage device in which the primary storage volumes 318 storing the dataset 314 were maintained).

From block 410 control proceeds to block 412 in which the SMS construct 304 determines the type of media that is to be used for the backup of the copy of the dataset stored in the intermediate storage volume 320, and based on the determination of the type of media, control proceeds to one of blocks 414, 416. 418, where in block 414 the backup is to a DASD, in block 416 to a cloud storage, and in block 418 to a tape storage.

If at block 404 it is determined that the SMS construct 304 to facilitate backup before delete is not present ("No" branch 420) control proceeds to block 422 in which the dataset 314 is deleted, without generating a point in time copy of the dataset 314 to an intermediate storage volume 320 for facilitating backup.

In z/OS based systems, data on a storage volume is maintained in datasets and pointers to these datasets are maintained within data set control block (DSCB) records 312 in the volume table of contents (VTOC) 310. When a dataset 314 is deleted the pointers to the dataset within the DSCB 312 are destroyed and access to the dataset 314 is lost. In z/OS based systems that execute the hierarchical storage manager (HSM) 302, an administrator may establish guidelines for how often different kinds of files are to be copied to a backup storage device. In certain embodiments, a data facility storage management subsystem (DFSMS) management class 306 is defined to invoke HSM 302 to facilitate a backup of the dataset before the dataset is deleted.

Therefore, FIGS. 3-4 illustrate embodiments to recover from accidental deletion of datasets in a z/OS based computer systems.

Figure 5:
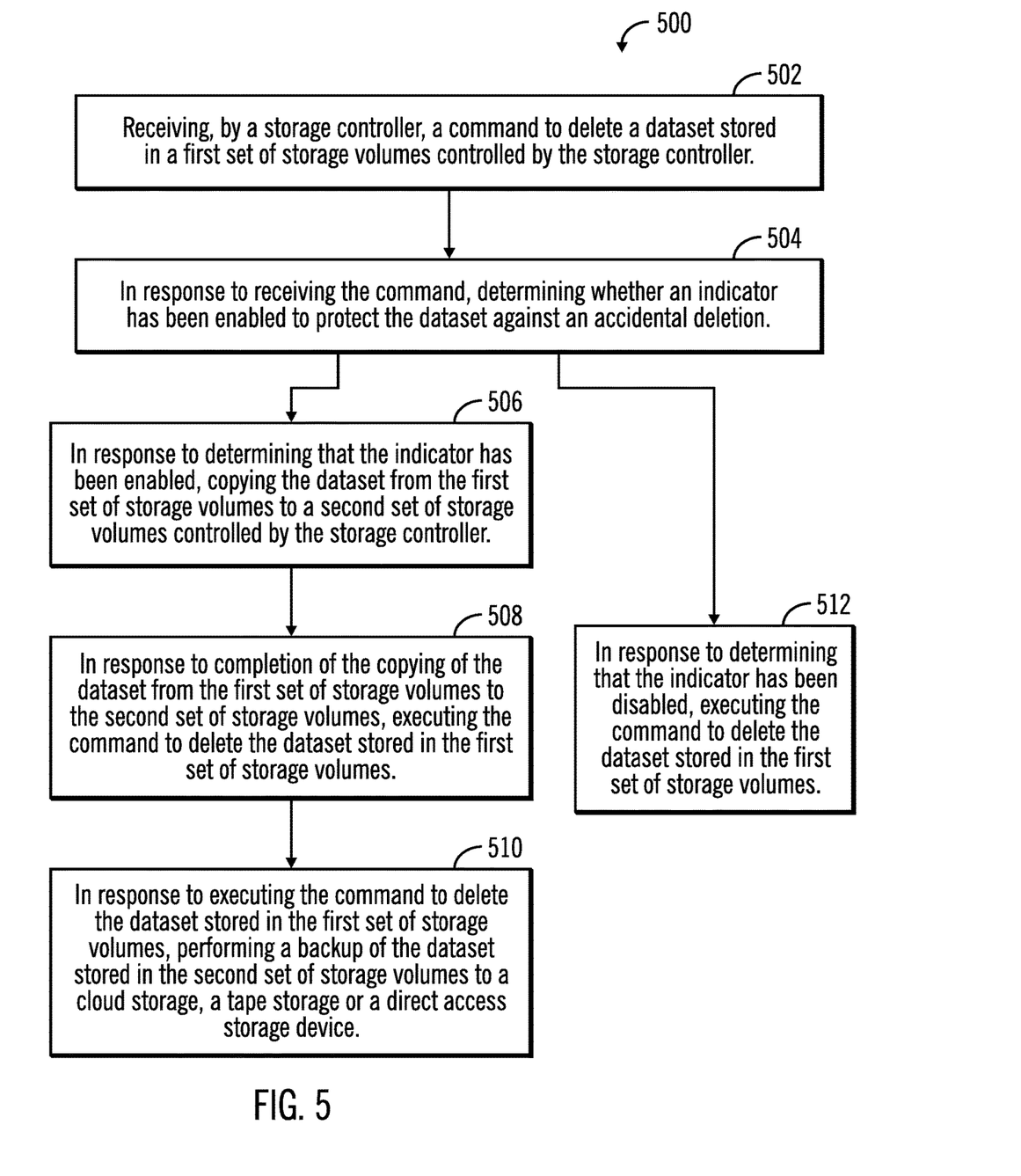
FIG. 5 illustrates a flowchart that shows operations to prevent accidental deletion of datasets in the computing environments of FIGS. 1 and 3, in accordance with certain embodiments.

FIG. 5 illustrates a flowchart 500 that shows operations to prevent accidental deletion of datasets in the computing environments 100, 300 of FIGS. 1 and 3, in accordance with certain embodiments. The operations shown in FIG. 5 may be performed by the storage management application 110 shown in FIG. 1 or the HSM 302 shown in FIG. 3.

Control starts at block 502 in which a storage controller 102 receives a command to delete a dataset 112 stored in a first set of storage volumes 114 controlled by the storage controller 102. In response to receiving the command, a determination is made (at block 504) as to whether an indicator 116 has been enabled to protect the dataset 112 against an accidental deletion.

From block 504 control may proceed to either block 506 or block 512, depending on the determination of whether the indicator 116 has been enabled to protect the dataset 112 against an accidental deletion.

In response to determining that the indicator 116 has been enabled, the dataset 112 is copied (at block 506) from the first set of storage volumes 114 to a second set of storage volumes 118 controlled by the storage controller 102. In response to completion of the copying of the dataset 112 from the first set of storage volumes 114 to the second set of storage volumes 118, the command to delete the dataset 112 stored in the first set of storage volumes 114 is executed (at block 508). From block 508 control proceeds to block 510 in which in response to executing the command to delete the dataset 112 stored in the first set of storage volumes 114, a backup is performed of the dataset stored in the second set of storage volumes 118 to a cloud storage, a tape storage or a direct access storage device.

At block 512, in response to determining that the indicator 116 has been disabled, the command to delete the dataset 112 stored in the first set of storage volumes 114 is executed.

In certain embodiments, the copying of the dataset from the first set of storage volumes 114 to the second set of storage volumes 118 is performed by a hardware implemented point in time copy operation performed by using the hardware point in time copy mechanism 308 shown in FIG. 3. In certain embodiments, the indicator is included in a plurality of indicators, wherein a first set of datasets are protected against accidental deletion by enabling a first set of indicators in the plurality of indicators, and wherein a second set of datasets are not protected against accidental deletion by disabling a second set of indicators in the plurality of indicators.

In certain embodiments, the executing of a command to delete a dataset 314 deletes a dataset control block record 312 stored in a volume table of contents 310, wherein the dataset control block record 312 maintains pointers to the dataset 314 stored in the first set of storage volumes (e.g. primary storage volumes 318). In further embodiments, the executing of the command to delete the dataset 314 deletes the dataset in the first set of storage volumes 318, wherein the storage controller 102 includes a hierarchical storage manager 302, a storage management subsystem construct 304 to determine a type of media from the backup, and a data facility storage management subsystem class 306 to protect the dataset against the accidental deletion.

Therefore, FIGS. 1-5 illustrate certain embodiments to protect against the loss of data from an accidental deletion.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 6:
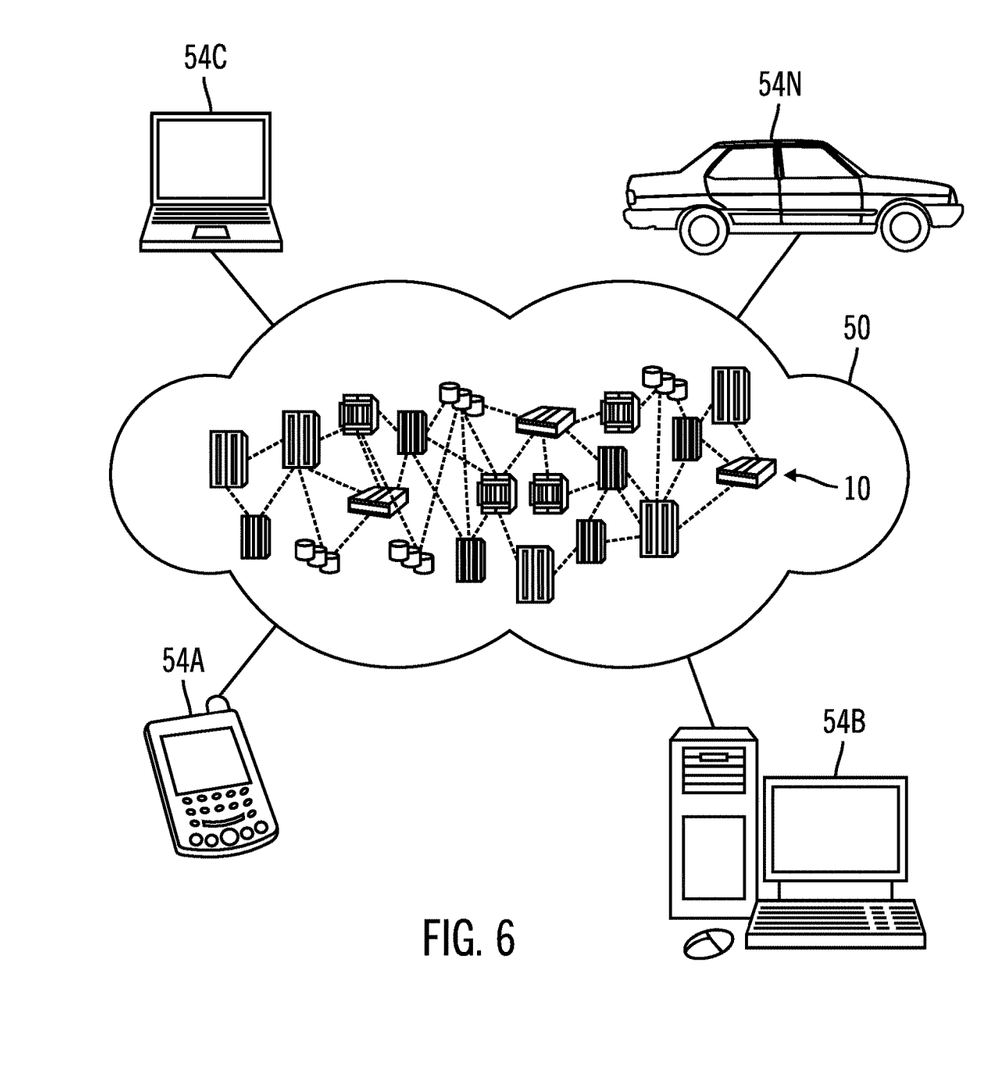
FIG. 6 illustrates a block diagram of a cloud computing environment, in accordance with certain embodiments.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
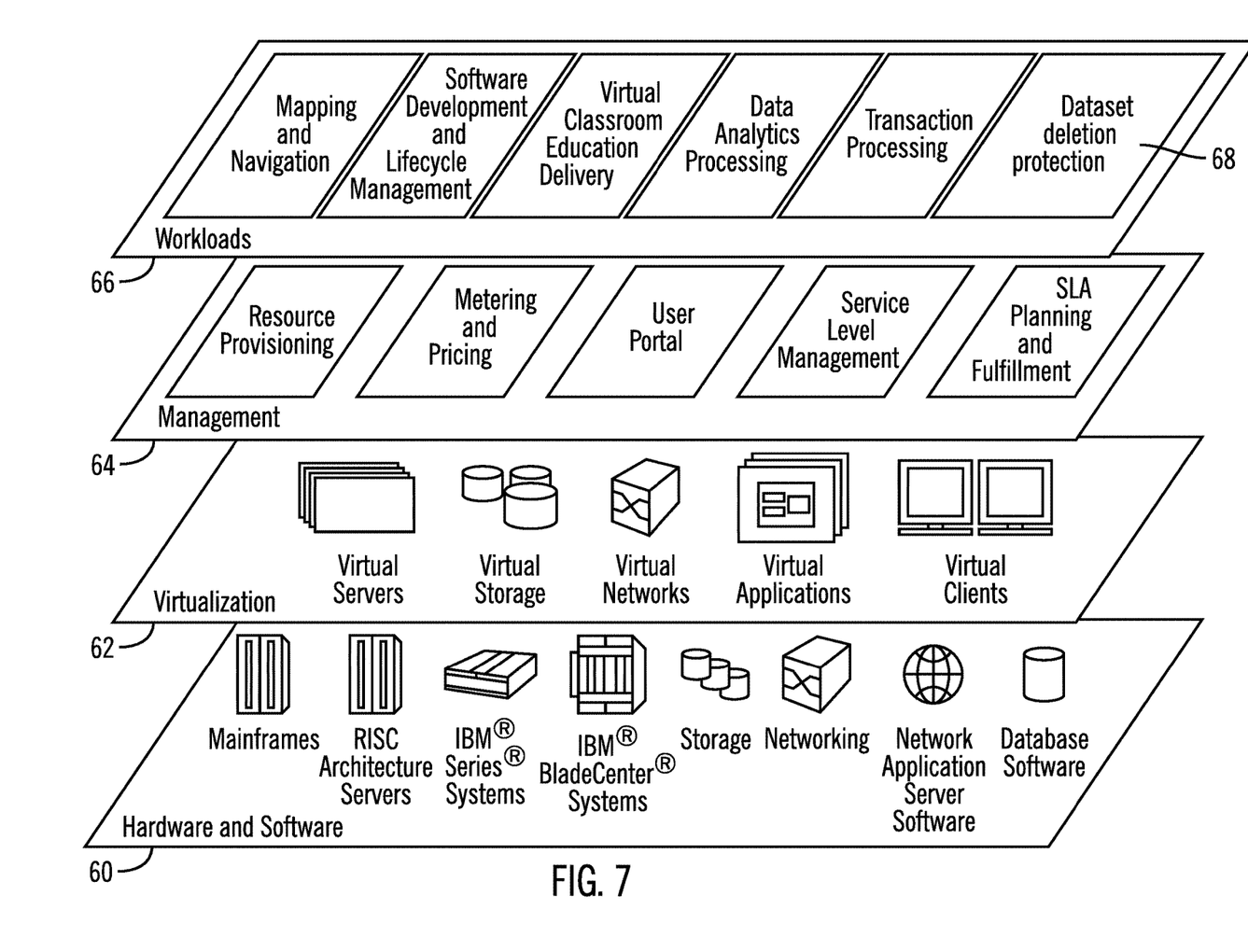
FIG. 7 illustrates a block diagram of further details of the cloud computing environment of FIG. 6, in accordance with certain embodiments.

Referring now to FIG. 7 a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, z/OS, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and dataset deletion protection 68 as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 8:
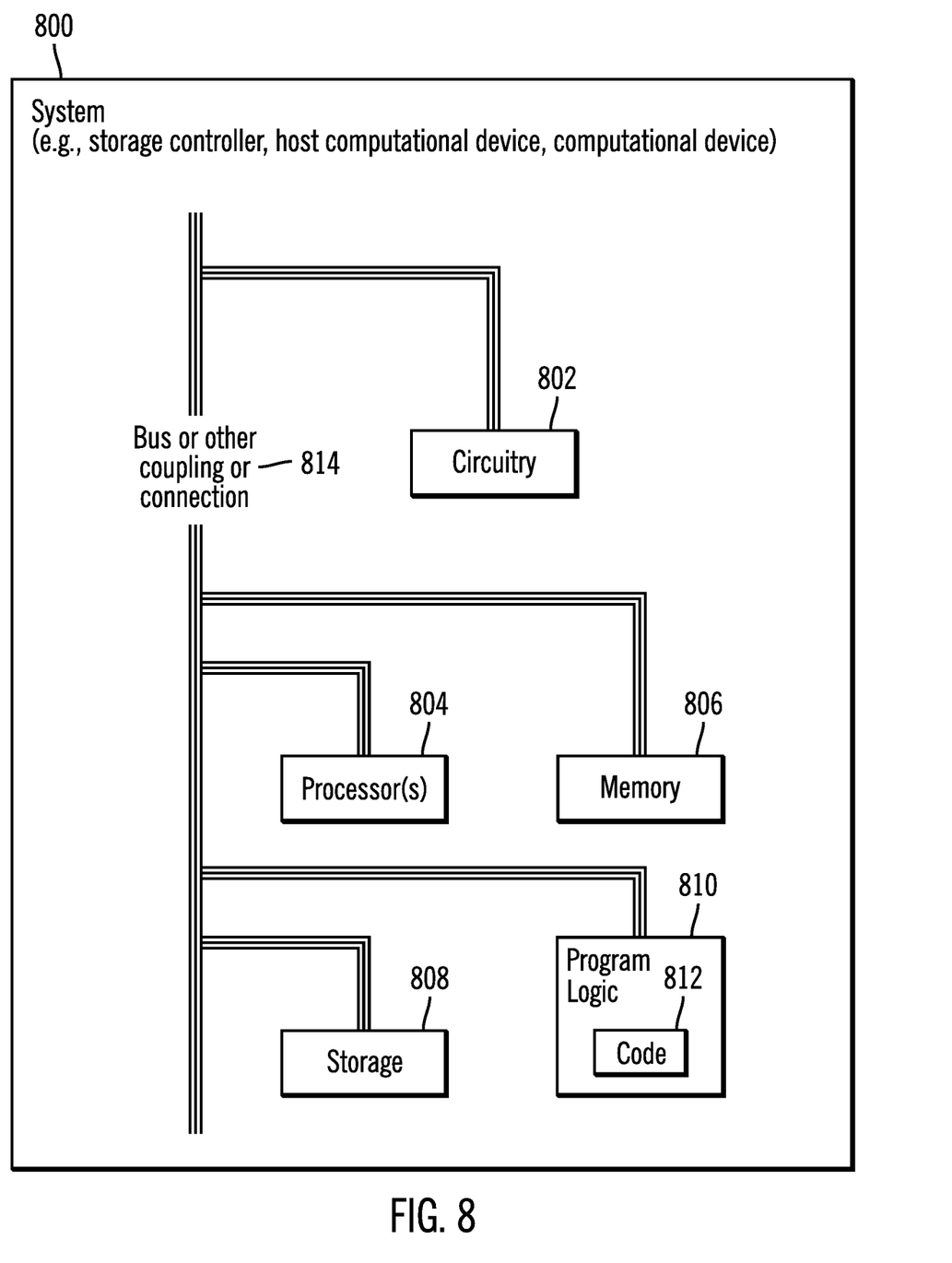
FIG. 8 illustrates a block diagram of a computational system that shows certain elements that may be included in the storage controller, and/or the host computational devices, as described in FIGS. 1-7, in accordance with certain embodiments.

FIG. 8 illustrates a block diagram that shows certain elements that may be included in the storage controller 102, and the host computational devices 104, 106 or other computational devices in accordance with certain embodiments. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. One or more of the components in the system 800 may communicate via a bus or via other coupling or connection 814. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving, by a storage controller, a command to delete a dataset stored in a first set of storage volumes controlled by the storage controller;
   in response to receiving the command, determining whether an indicator has been enabled to protect the dataset against an accidental deletion;
   in response to determining that the indicator has been enabled, copying the dataset from the first set of storage volumes to a second set of storage volumes controlled by the storage controller within 500 milliseconds of the receiving of the command to delete the dataset by maintaining both the first and the second set of storage volumes within the storage controller and not outside of the storage controller;

in response to completion of the copying of the dataset from the first set of storage volumes to the second set of storage volumes, executing the command to delete the dataset stored in the first set of storage volumes, wherein the copying of the dataset from the first set of storage volumes to the second set of storage volumes occurs subsequent to the receiving of the command to delete the dataset in the first set of storage volumes but prior to the executing of the command to delete the dataset in the first set of storage volumes; and subsequent to deletion of the dataset from the first set of storage volumes, performing a backup of the dataset from the second set of storage volumes that is maintained within the storage controller to a storage device located outside of the storage controller.

2. The method of claim 1, the method further comprising:
in response to executing the command to delete the dataset stored in the first set of storage volumes, performing the backup of the dataset stored in the second set of storage volumes to a cloud storage, a tape storage or a direct access storage device.

3. The method of claim 2, the method further comprising:
in response to determining that the indicator has been disabled, executing the command to delete the dataset stored in the first set of storage volumes.

4. The method of claim 3, wherein the copying of the dataset from the first set of storage volumes to the second set of storage volumes is performed by a hardware implemented point in time copy operation.

5. The method of claim 4, wherein the storage controller includes a hierarchical storage manager, a storage management subsystem to determine a type of media from the backup, and a data facility storage management subsystem class to protect the dataset against the accidental deletion.

6. The method of claim 3, wherein the indicator is included in a plurality of indicators, wherein a first set of datasets are protected against accidental deletion by enabling a first set of indicators in the plurality of indicators, and wherein a second set of datasets are not protected against accidental deletion by disabling a second set of indicators in the plurality of indicators.

7. The method of claim 3, wherein the executing of the command to delete the dataset deletes a dataset control block record stored in a volume table of contents, and wherein the dataset control block record maintains pointers to the dataset stored in the first set of storage volumes.

8. A system, the system comprising:
a memory; and
a processor coupled to the memory, wherein the processor performs operations, the operations comprising:
receiving, by the system, a command to delete a dataset stored in a first set of storage volumes controlled by the system;
in response to receiving the command, determining whether an indicator has been enabled to protect the dataset against an accidental deletion;
in response to determining that the indicator has been enabled, copying the dataset from the first set of storage volumes to a second set of storage volumes controlled by the system within 500 milliseconds of the receiving of the command to delete the dataset by maintaining both the first and the second set of storage volumes within the system and not outside of the system;

in response to completion of the copying of the dataset from the first set of storage volumes to the second set of storage volumes, executing the command to delete the dataset stored in the first set of storage volumes, wherein the copying of the dataset from the first set of storage volumes to the second set of storage volumes occurs subsequent to the receiving of the command to delete the dataset in the first set of storage volumes but prior to the executing of the command to delete the dataset in the first set of storage volumes; and subsequent to deletion of the dataset from the first set of storage volumes, performing a backup of the dataset from the second set of storage volumes that is maintained within the system to a storage device located outside of the system.

9. The system of claim 8, the operations further comprising:
in response to executing the command to delete the dataset stored in the first set of storage volumes, performing the backup of the dataset stored in the second set of storage volumes to a cloud storage, a tape storage or a direct access storage device.

10. The system of claim 9, the operations further comprising:
in response to determining that the indicator has been disabled, executing the command to delete the dataset stored in the first set of storage volumes.

11. The system of claim 10, wherein the copying of the dataset from the first set of storage volumes to the second set of storage volumes is performed by a hardware implemented point in time copy operation.

12. The system of claim 11, wherein the executing of the command to delete the dataset deletes a dataset control block record stored in a volume table of contents, and wherein the dataset control block record maintains pointers to the dataset stored in the first set of storage volumes.

13. The system of claim 12, wherein the system is a storage controller that includes a hierarchical storage manager, a storage management subsystem to determine a type of media from the backup, and a data facility storage management subsystem class to protect the dataset against the accidental deletion.

14. The system of claim 10, wherein the indicator is included in a plurality of indicators, wherein a first set of datasets are protected against accidental deletion by enabling a first set of indicators in the plurality of indicators, and wherein a second set of datasets are not protected against accidental deletion by disabling a second set of indicators in the plurality of indicators.

15. A computer program product, the computer program product comprising a computer readable storage medium having computer readable program code embodied therewith, the computer readable program code configured to perform operations on a storage controller, the operations comprising:
receiving, by the storage controller, a command to delete a dataset stored in a first set of storage volumes controlled by the storage controller;
in response to receiving the command, determining whether an indicator has been enabled to protect the dataset against an accidental deletion;
in response to determining that the indicator has been enabled, copying the dataset from the first set of storage volumes to a second set of storage volumes controlled by the storage controller within 500 milliseconds of the receiving of the command to delete the dataset by maintaining both the first and the second set of storage volumes within the storage controller and not outside of the storage controller;

in response to completion of the copying of the dataset from the first set of storage volumes to the second set of storage volumes, executing the command to delete the dataset stored in the first set of storage volumes, wherein the copying of the dataset from the first set of storage volumes to the second set of storage volumes occurs subsequent to the receiving of the command to delete the dataset in the first set of storage volumes but prior to the executing of the command to delete the dataset in the first set of storage volumes; and subsequent to deletion of the dataset from the first set of storage volumes, performing a backup of the dataset from the second set of storage volumes that is maintained within the storage controller to a storage device located outside of the storage controller.

16. The computer program product of claim 15, the operations further comprising:

in response to executing the command to delete the dataset stored in the first set of storage volumes, performing the backup of the dataset stored in the second set of storage volumes to a cloud storage, a tape storage or a direct access storage device.

17. The computer program product of claim 16, the operations further comprising:

in response to determining that the indicator has been disabled, executing the command to delete the dataset stored in the first set of storage volumes.

18. The computer program product of claim 17, wherein the copying of the dataset from the first set of storage volumes to the second set of storage volumes is performed by a hardware implemented point in time copy operation.

19. The computer program product of claim 18, wherein the storage controller includes a hierarchical storage manager, a storage management subsystem to determine a type of media from the backup, and a data facility storage management subsystem class to protect the dataset against the accidental deletion.

20. The computer program product of claim 17, wherein the indicator is included in a plurality of indicators, wherein a first set of datasets are protected against accidental deletion by enabling a first set of indicators in the plurality of indicators, and wherein a second set of datasets are not protected against accidental deletion by disabling a second set of indicators in the plurality of indicators.

* * * * *